US007761560B2

(12) United States Patent
Ahrndt

(10) Patent No.: US 7,761,560 B2
(45) Date of Patent: Jul. 20, 2010

(54) METHOD FOR PROCESSING A DATA FLOW ACCORDING TO THE CONTENT THEREOF

(75) Inventor: Thomas Ahrndt, Ottobrunn (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 570 days.

(21) Appl. No.: 11/663,080

(22) PCT Filed: Aug. 27, 2005

(86) PCT No.: PCT/EP2005/009274

§ 371 (c)(1),
(2), (4) Date: Mar. 15, 2007

(87) PCT Pub. No.: WO2006/037406

PCT Pub. Date: Apr. 13, 2006

(65) Prior Publication Data

US 2008/0077688 A1 Mar. 27, 2008

(30) Foreign Application Priority Data

Oct. 2, 2004 (DE) .................... 10 2004 048 167

(51) Int. Cl.
G06F 15/173 (2006.01)
(52) U.S. Cl. .................. 709/224; 709/236; 709/240; 709/239; 709/249; 707/1; 707/10; 370/392; 370/429; 370/395; 455/3; 455/556
(58) Field of Classification Search .............. 709/236, 709/240, 239, 249, 224; 707/1, 3, 10; 455/3, 455/556; 370/392, 429, 395
See application file for complete search history.

(56) References Cited

U.S. PATENT DOCUMENTS

| 6,654,373 | B1 * | 11/2003 | Lie et al. ............. 370/392 |
| 2002/0038365 | A1 * | 3/2002 | Yeh ..................... 709/224 |
| 2003/0065711 | A1 | 4/2003 | Acharya et al. |
| 2004/0002359 | A1 * | 1/2004 | Deas et al. ............. 455/556.2 |
| 2005/0060295 | A1 * | 3/2005 | Gould et al. ............. 707/3 |
| 2005/0060420 | A1 * | 3/2005 | Kovacevic ............. 709/231 |

FOREIGN PATENT DOCUMENTS

EP 0 784 838 B1 6/2000
EP 1 079 627 A1 2/2001

OTHER PUBLICATIONS

Dharmapurikar et al.: "Deep packet inspection using parallel bloom filters"; High Performance Interconnects, 2003. Proceedings. 11$^{TH}$ Symposium on Aug. 20-22, 2003, Piscataway, NJ, USA, IEEE; Aug. 20, 2003, pp. 44-51, XP-010657973, ISBN: 0-7695-2012-X.

(Continued)

*Primary Examiner*—Wing F Chan
*Assistant Examiner*—Benjamin M Thieu
(74) *Attorney, Agent, or Firm*—Laurence A. Greenberg; Werner H. Stemer; Ralph E. Locher

(57) ABSTRACT

A method of content-related processing of a data flow compares the data flow with a list of known data flows, and determines whether the data flow is recognized as a known data flow. When the data flow is recognized as a known data flow, the data flow is processed as specified in the list. When the data flow is not recognized as a known data flow, successively analyzing the data flow until a content type of the data flow is sufficiently recognized in order to decide how to process the data flow.

3 Claims, 1 Drawing Sheet

OTHER PUBLICATIONS

Subbiah et at.: "Content aware networking in the internet: issues and challenges"; ICC 2001. 2001 IEEE International Conference on Communications. Conference Record. Helsinky, Finland, Jun. 11-14, 2001, IEEE International Conference on Communications, New York, NY: IEEE, US, vol. 1 of 10, Jun. 11, 2001, pp. 1310-1315, XP-010553538, ISBN: 0-7803-7097-1.

Mitra et al.: "Wide-area content-based routing mechanism"; Parallel and Distributed Processing Symposium, 2003. Proceedings. International Apr. 22-26, 2003, Piscataway, NJ, USA, IEEE; Apr. 22, 2003, pp. 246-253, XP-010645370, ISBN: 0-7695-1926-1.

Gold et al.: "Towards a content-based aggregation network"; Peer-To-Peer Computing, 2001. Proceedings. First International Conference on Linkoping, Sweden Aug. 27-29, 2001, Los Alamitos, CA, USA, IEEE Comput, Soc, US, Aug. 27, 2001, pp. 62-68, XP-010583976, ISBN: 0-7695-1503-7.

\* cited by examiner

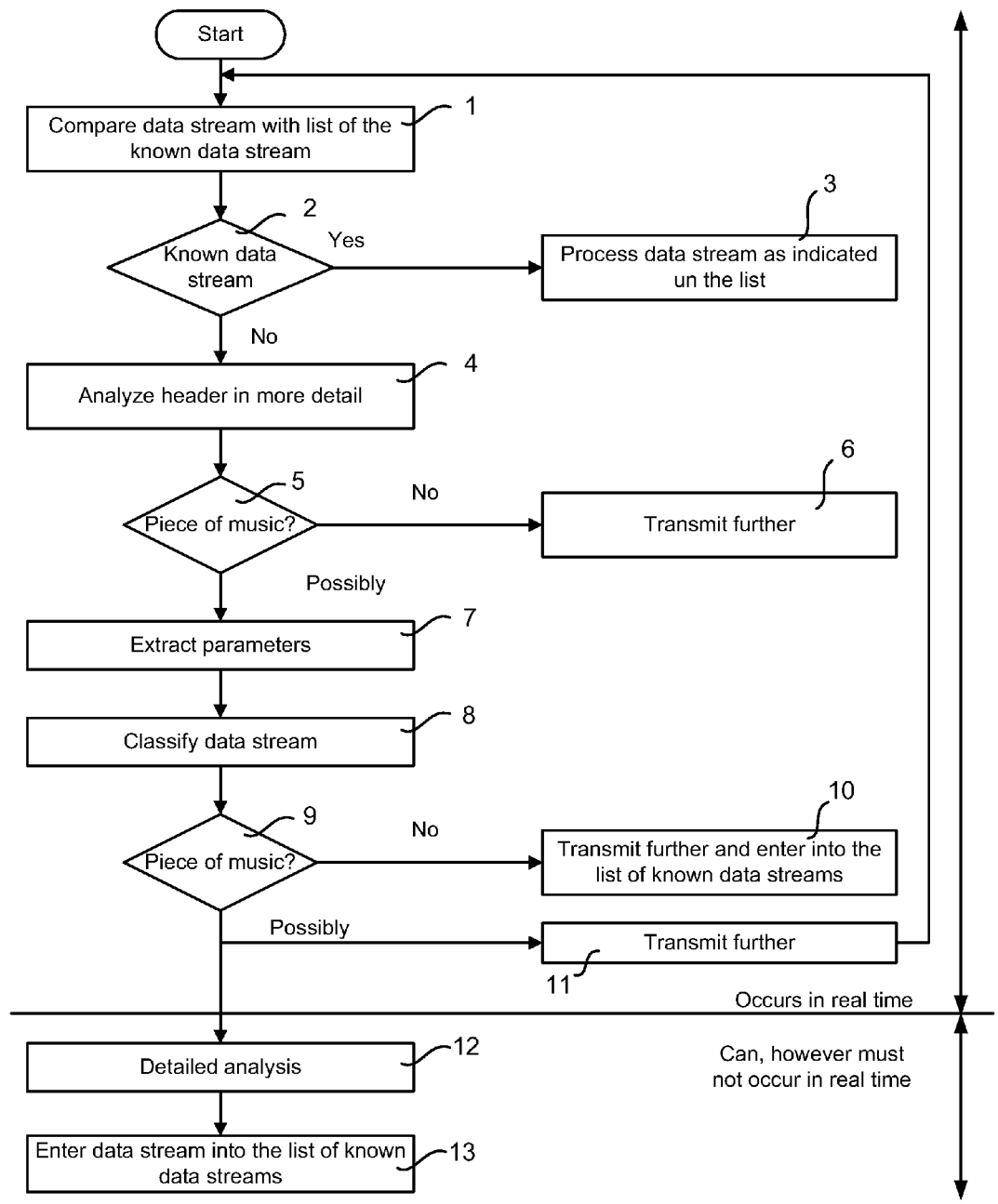

METHOD FOR PROCESSING A DATA FLOW ACCORDING TO THE CONTENT THEREOF

BACKGROUND OF THE INVENTION

The invention relates to a method for processing a data flow according to the content thereof. The method therefore enables the data flow to be processed in different ways according to the nature of the content thereof. The method may be used in particular on processors for controlling data flow.

At present, by means of services offered on the Internet, such as—for example—the Kazaa network and free exchange services such as BearShare or Audiogalaxy, it is possible for data to be stored and made accessible—not on a central server, but for data stored locally on a user processor to be made available for searching and transferable to a different user processor. This is known as file sharing. In the case of Napster, for example, all files and users are placed on an extensive central index for this purpose. The files are then exchanged directly between the users.

It is always difficult to differentiate data flows with copyright-protected content from those without copyright-protected content. In a peer-to-peer network in particular, such as is implemented in Napster, for example, it is difficult to make the forwarding of data flows dependent on the nature of the content.

Thus, for example, European patent EP 0 784 838 B1 discloses a method wherein a data flow is compared with a list of known data flows, and wherein—if said data flow is recognized as a known data flow—it is further processed according to a predefined manner, e.g. by alerting a police patrol. Often, however, the problem remains of what to do with the data flow if a match cannot be found with any of the list entries. A further method for detecting copyright-protected data is disclosed by European patent application EP 1 079 627 A1. This method, however, is based on the recognition of a digital watermark in the data flow which has been added to the data flow beforehand. This method cannot therefore be used for data flows that do not have such a digital watermark.

SUMMARY OF THE INVENTION

One object of the invention, therefore, is to provide a method for processing a data flow according to the content thereof, wherein the nature of the content of the data flow is recognized and the data flow can then be processed in different ways according to the nature of its contents.

The inventive method for processing a data flow according to the content thereof comprises a first stage in which the data flow is compared with a list of known data flows, and, in the case when the data flow is recognized as the known data flow, said data flow is processed as specified in the list. If this is not the case, i.e. when the data flow is not recognized as the known data flow, said data flow is additionally successively analyzed until the nature of the content thereof is sufficiently recognized in order to enable the manner in which it is processable to be decided.

The inventive computer program product is stored on a medium that can be used by a processor unit, and contains a program code readable for the processor unit. The computer program product ensures that the processor unit executes the aforementioned method.

Advantageous further developments of the invention are derived from the features described in the dependent claims.

In a first embodiment of the inventive method, the data flow is analyzed by analysis of the administration data of a packet of the data flow. This analysis method is simple and quick to carry out.

The administration data to be analyzed preferably comprises the sender address and/or the recipient address of a packet of the data flow and/or the port number specified in the packet.

In a second embodiment of the inventive method, the data flow is analyzed by analysis of the user data of a packet of the data flow. In this way the detection accuracy can be increased further.

It is particularly advantageous if the administration data and the user data of a packet of the data flow are analyzed in real time. In this way the data to be transferred can be forwarded to the recipient without interruption. The quality of the data transmission itself can thus be maintained.

In order to achieve this object it is further proposed that, in the inventive method, analysis of the data flow is carried out by cross-correlation of the data flow with known data flows. The data flow is then entered in the list of known data flows. The way in which the data flow is to be processed is also entered in the list, in which case the way in which the data flow is to be processed is made dependent on the result of the correlation. This has the advantage that the next incoming packet of the data flow need only be compared with the list of known data flows in order to decide how the data flow is to be processed.

In the inventive method, the data flow may contain TCP/IP packets.

For a further development of the inventive method it is proposed that, if the nature of the content of the data flow is of the copyright-protected work type, then either the data flow is not forwarded, or is forwarded in corrupted form, or is forwarded and a charge is made.

The inventive method may be used in particular for pieces of music, video sequences, software, electronic books, listening books and/or images.

BRIEF DESCRIPTION OF THE SEVERAL VIEWS OF THE DRAWINGS

The invention is described in greater detail below with several exemplary embodiments and with the help of a drawing.

The single FIGURE depicts a flow chart showing one possible embodiment of the inventive method for processing a data flow according to the content thereof.

DETAILED DESCRIPTION OF THE INVENTION

The invention is explained in greater detail below on the basis of a flow chart of an exemplary embodiment, as shown in the FIGURE. The application shown in the FIGURE is geared to the searching of incoming data flows for pieces of music and is installed on a processor for controlling the data flow, which is also designated as a processor unit for processing or managing data traffic.

When this processor receives a data flow, said data flow is compared in a first stage 1 with a list of known data flows. The list or look-up table may, for example, be stored in a database and—in addition to the known data flows—may also contain information on how the known data flows are to be further processed. In the list, for example, a flag may be stored to the effect that, if the content of the data flow is of the copyright-protected work type, then said data flow is not to be forwarded to the recipient. If the content of the data flow is of the e-mail type, on the other hand, then it is to be forwarded to the recipient.

If it is established in stage 2 that the incoming data flow is already known, said incoming data flow is processed as specified in the list (cf. stage 3).

If, however, the incoming data flow cannot be assigned to any of the known data flows, the header of one packet of the data flow is analyzed in greater detail in a stage 4. The header contains administration data that is used by different services in order to process the file or packet and transfer it correctly. The recipient address and the port number are also specified in the header in addition to the send address. The send address contains information about the data source and thus about the origin of the packet. In the inventive method, various known data sources or their send addresses may be stored in a database, to enable them to be compared with the send address of the newly incoming packet. The send addresses stored in the database may, for example, be addresses of internet service providers from which it is known which services or data may be obtained from then. In the Transmission Control Protocol/ Internet Protocol (TCP/IP) the port number is a suffix to the IP address or Uniform Resource Locator (URL), that specifies which application or Internet service is to be activated on the destination processor.

If the analysis of the header indicates that the packet or data flow is not a piece of music (cf. stage 5), then the packet is forwarded to the recipient in a stage 6 and the next packet in the data flow is awaited.

If, however, the data flow is potentially a piece of music, then parameters enabling the packet to be classified are extracted from the body of the packet, which contains the actual user data. After the parameters have been extracted in stage 7, they are used in a stage 8 in order to classify the data flow or packet. In this case, for example, it is possible to differentiate between two types of data stream content, i.e. whether the content may or may not comprise music. It is, however, also possible to classify or categorize the nature of the content of the data flow more precisely, for example according to data, image, speech, classical music, pop music, video sequences, electronic books, listening books, etc. In the exemplary embodiment shown in the FIGURE the data flow is only checked in order to determine whether or not the content of the data flow is a piece of music.

If the classification indicates that the nature of the content of the data flow is not a piece of music (cf. stage 9), then the packet is forwarded to the recipient. In addition the data flow is now entered in the list of known data flows and flagged to indicate that this data flow is not a piece of music, and every other packet in the data flow is therefore to be sent to the recipient (cf. stage 10). The next packet of the data flow is then awaited. If, however, the classification of the data flow indicates that the nature of the content of the data flow is potentially a piece of music, the investigated packet is still forwarded to the recipient according to stage 11 in order to avoid any interruption in the data flow, but now—in stage 12—a detailed analysis of the packet is carried out in addition. If there is sufficient processor capacity the analysis in stage 12 can be carried out in real time. If the processor capacity available is insufficient for the analysis in stage 12, the analysis may also be carried out offline. To enable the incoming packet to be analyzed in detail, it may be compared with one or more pieces of music stored in a database by means of cross-correlation. Then, in a stage 13, the analyzed data flow is entered in the list of known data flows and, depending on the result of the correlation, the way in which the data flow is to be processed is noted on the list. If the analysis carried out in stage 12 indicates that the nature of the content of the data flow is a piece of music, then—for example—a flag may be entered in this list to indicate that this data flow is not to be forwarded. Instead, however, a flag may also be entered to indicate that this data flow is to be forwarded in corrupted form or that this data flow is to be forwarded and a charge made.

The extraction of parameters carried out in stage 7 may be performed—for example—by means of a deep packet inspection. In deep packet inspection the content of the header and body is analyzed regardless of the protocol or application assigned to the packet. The analysis is carried out, wherein the IP datagrams, TCP data flows and UDP packets are reassembled when they flow through the processor unit for processing of the data traffic, to enable the entire content of the application or data flow to be made visible. In a subsequent stage the received packets can then be processed in a previously defined manner. A more detailed explanation of analysis with the help of deep packet inspection can be found in "Deep Packet Inspection using Parallel Bloom Filters", S. Dharmapurikar et al., Computer Science and Engineering Department, Washington University in Saint Louis.

The efficiency of the inventive method can be further increased by division into real-time-related and non-real-time-related tasks. Classification by feature extraction in real time likewise results in increased performance since not every packet of the data flow needs to be compared in detail with the pieces of music stored in a database. In order to extract the parameters (stage 7), methods from speech signal processing, such as—for example—histogram analysis, may be used.

It is known that a data flow usually has a final length. It is therefore expedient for monitoring of the data flow to be terminated upon expiry of a certain duration T and for the data flow to be deleted from the list of known data flows.

The present invention may be implemented in the form of hardware, software or as a combination of hardware and software. This may include any type of computer system or device that is suitable for implementation of the aforementioned method. A typical combination of hardware and software could, for example, be an all-purpose computer which is equipped with a computer program which, when loaded and executed, controls the processor in such a way that it executes the method in the aforementioned manner. The invention may also be a component of a computer program product which comprises all features that are necessary in order to implement the aforementioned method, and which—when loaded in the processor or computer—is capable of executing the aforementioned method stages.

The inventive method is not restricted to the exemplary embodiment shown in the FIGURE, but may be used generally for the purpose of identifying copyright-related data in a data flow.

The aforementioned description of the exemplary embodiments in accordance with the present invention is merely for illustrative purposes and is not intended to limit the invention. Within the context of the invention, various changes and modifications are possible without abandoning the scope of the invention or its equivalents.

The invention claimed is:

1. A method of copyright-related processing of a data flow comprising:
   providing a database of known data flows and of internet service providers from which it is known which service or data may be obtained from them;
   comparing the data flow with the database of known data flows;

determining whether the data flow is recognized as a known data flow;

processing said data flow as specified in the database when the data flow is recognized as a known data flow; and, when the data flow is not recognized as a known data flow, successively analyzing the data flow until a content type of the data flow is sufficiently recognized in order to decide how to process the data flow;

thereby first analyzing administration data comprising at least one of sender address, recipient address and a port number of a packet of the data flow and if not successful, subsequently analyzing user data of a packet of the data flow wherein the data flow is analyzed by cross-correlation of the data flow with known data flows, and wherein:

the administration data and the user data of a packet of the data flow are analyzed in real time;

the data flow is entered in the database of known data flows, and the way in which the data flow is to be processed is entered in the database depending on the result of the correlation; and wherein, if the type of the content of the data flow is a copyright-protected work, selecting one of not forwarding the data flow, forwarding the data flow in corrupted form, and forwarding the data flow at a charge.

2. The method of claim 1, wherein the data flow contains TCP/IP packets.

3. The method of claim 1, wherein the copyright-protected work includes at least one of music, video sequences, software, electronic books, listening books and images.

* * * * *